Sept. 20, 1971          B. R. TAYLOR          3,606,103
DIVIDER SPOUT
Filed Oct. 29, 1968

Inventor
Billy R. Taylor

United States Patent Office 3,606,103
Patented Sept. 20, 1971

3,606,103
DIVIDER SPOUT
Billy R. Taylor, 210 Willow Wood,
Levelland, Tex. 79336
Filed Oct. 29, 1968, Ser. No. 771,389
Int. Cl. B67d 3/00
U.S. Cl. 222—478                2 Claims

ABSTRACT OF THE DISCLOSURE

A divider spout having scatter bars positioned to divide and disperse a gravity flow of material to the lower chambers and median dividing point of the inside lower chamber walls to result in division of this material.

---

This invention relates to divider spout for granular materials. The invention provides a device for dividing such materials as seed, fertilizer, herbicides, insecticides, nematocides, and many other industrial and agricultural granular materials, thereby, reducing the number of metering or distribution systems needed to supply materials to multiple exit points.

Previous attempts have been made to construct a simple divider spout that would use one distribution source of materials to equally serve two exit points. These attempts have had the general result of giving unequal division when size of material or specific entry point into the spout is changed. Some have provided a movable divider bar to attempt a setting for each use, but slight movement of the entry point or the spout changes division.

This invention overcomes most of these disadvantages and provides several other advantages.

It is the general object of the invention to provide a device and a principle for giving near equal division of granular material by gravity flow.

It is a specific object of the invention to eliminate the need for two seed distribution systems when changing from single to double seed furrows, within a normal row width, and in other close row spacings with a seed planter.

It is a further object of this invention to provide near equal division of a variety of seed or granule sizes.

It is a further object of the invention to eliminate the need for close control of the entry point of material to be divided and thus reduce bridging, constriction, stoppage points, and further provide adaption to a wide range of planter boxes or other distribution systems.

It is a further object of the invention to accomplish division of materials with a minimum amount of vertical travel.

Briefly described the invention comprises an upper entry chamber to direct a flow of granular material with a minimum of constriction. Two lower chambers divide the upper entry chamber. Scatter bars are positioned to disperse a flow of material through the upper entry chamber before this material reaches the final division of the median dividing point of the inside lower chamber walls. Each of the said scatter bars are positioned to divide a flow of materials to both lower chambers.

The invention will be better understood from the following detail description of certain specific, preferred embodiments, taken in connection with the accompanying drawing forming a part of this specification, wherein.

Figure 1:
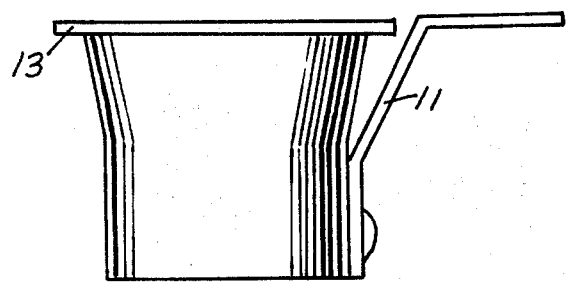
FIG. 1 is a front elevation view of a funnel to attach the divider spout shown in FIG. 2 to a planter box or other material distribution system.
Figure 2:
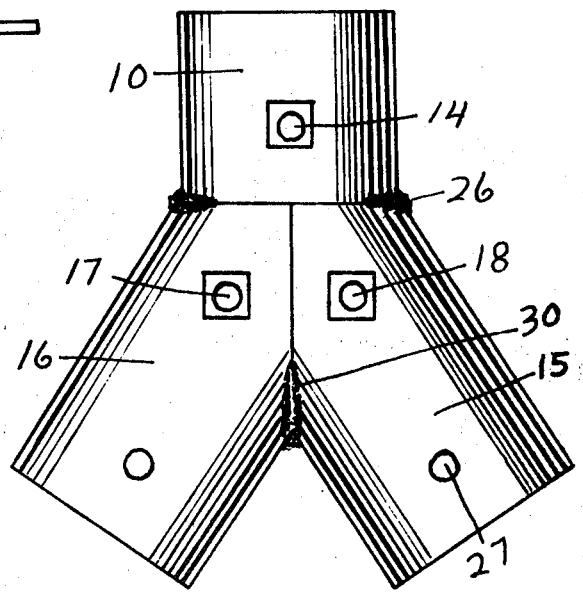
FIG. 2 is a front elevation view of a divider spout constructed according to the invention.

In the specific application of the invention to a planter box for division of seed, a plastic funnel as shown in FIG. 1 is used to incase the upper entry chamber 10 and further attach it to the planter box. A universal bracket 11 is secured through a hole 12 in the upper entry chamber wall and provides attachment to some types of material distribution systems. The flange 13 on the funnel provides attachment to others. Various other arrangements could be provided to connect the upper entry chamber to the supply or distribution source or materials. The seed funnel shown in FIG. 1 can also be secured to the upper entry chamber by the upper scatter bar 14 which would be further characterized as a bolt through opposing holes in the upper entry chamber walls.

The upper entry chamber 10 is of sufficient length to direct the flow of materials downward and prevent the entry of said materials into the lower chambers 15 and 16 at a sharp angle.

The upper entry chamber scatter bar 14 is not necessary for near equal division under most situations using the divider spout; however, by improving the function of the upper entry chamber it more nearly perfects division under some adverse conditions. The upper entry chamber scatter bar 14 is best positioned generally parallel to the lower chamber scatter bars 17 and 18 and further located in the center portion of the upper entry chamber 10. In this position it disperses and deflects an excessive direct flow of material to the median dividing point 19. It also serves these functions to an angled flow of material through the upper entry chamber.

The outside lower chamber walls 20 and 21 diverge from the opposing side walls 22 and 23 of the upper entry chamber to give sufficient clearance for materials passing outside the lower scatter bars 17 and 18.

The inside lower chamber walls 24 and 25 join at a median dividing point 19 to form the final division between the two lower chambers.

Materials of construction are those commonly used in parts of the nature shown, except as specifically stated to the contrary.

Figure 3:
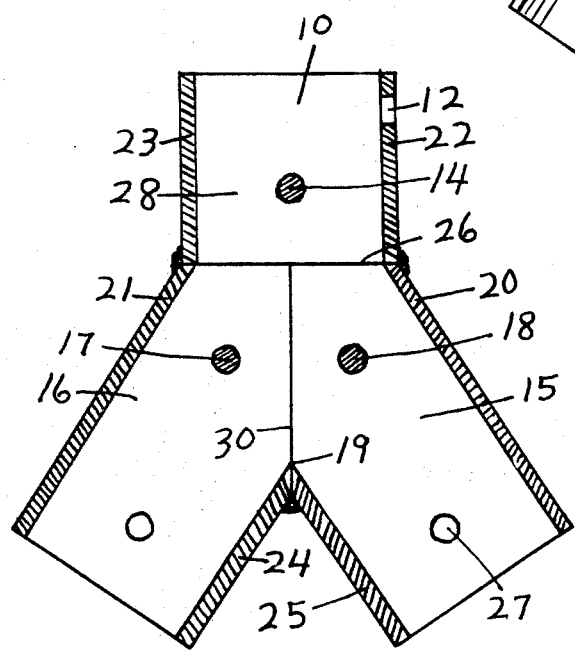
FIG. 3 is a sectional view taken on line 3—3 of FIG. 4.
Figure 4:
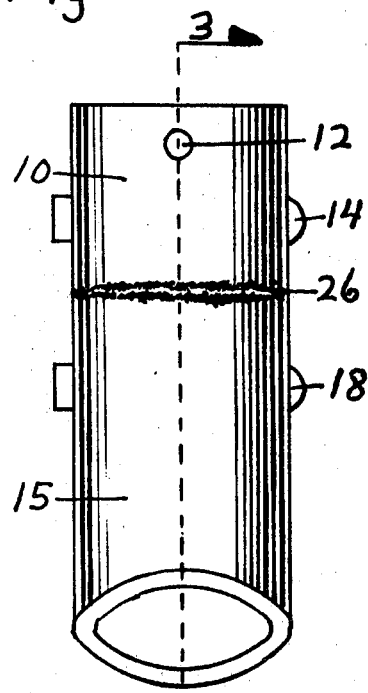
FIG. 4 is a side elevation view of the device as shown in FIG. 2.
Figure 5:
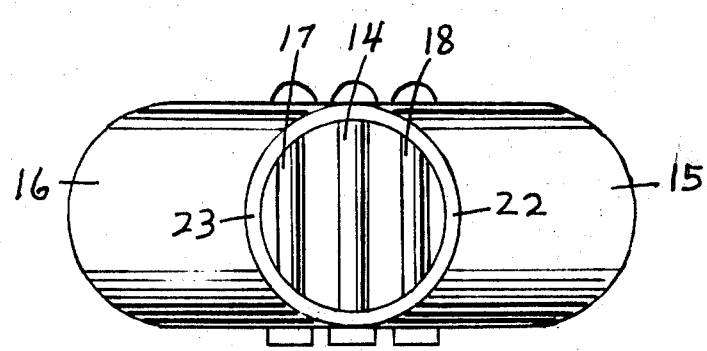
FIG. 5 is a top plan view of the device as shown in FIG. 2.

The previously described chambers could be constructed of extruded plastic or cast of metal in a solid piece. The spout chambers could also be formed or cast as front and back halves and held together by the scatter bars or spot welding. FIG. 3 shows half of the device as it could be formed in this manner.

The specific example herein disclosed for making the invention is constructed of hollow tubing having inside dimension of approximately one and three-tenths inches and outside dimension of one and one-half inches. This method of construction helps to better understand the invention. The tubing of the required length is sawed at an angle of approximately 35 degrees. The two resulting pieces are then reversed and welded at the median line 30. A saw cut is then made at joint 26, which is located to conform to the inside dimensions of the upper entry chamber 10, and welded to said chamber.

In the specific use with a seed planter a hole 27, or other suitable attachment, is provided at the lower end of each lower chamber for a seed tube leading to seed furrow opening devices of the planter.

The lower scatter bars 17 and 18 are secured by opposing holes through the lower chamber walls. Three-sixtenths inch diameter round bar or bolts has been found to be satisfactory, in this combination of dimensions, for the said scatter bars.

The lower scatter bars 17 and 18 are disposed beneath the upper entry chamber, parallel to each other, and of sufficient horizontal distance from a vertical imaginary line, extending the side walls 22 and 23 of the upper entry chamber, to provide division of material flowing down the outside area 28 of each opposing side wall of the upper entry chamber. The said outside area 28 is defined as the space between the upper scatter bar 14 and the side wall 23 of the upper entry chamber.

In this specific combination of dimensions, the said horizontal distance of near two-tenths inch from the center of the lower scatter bar 17 to the side wall 23 of the upper entry chamber has been found to give near equal division of seed or granules ranging between the sizes of grain sorghum and soybean seed.

Proper division is also affected to some extent by the placement of the lower scatter bars 17 and 18 as they relate to the median dividing point 19. The previously described horizontal placement provides that generally less than one-half of the material is deflected to the outside of the lower scatter bar 17. Division is further equalized by the deflection of the balance of the material over the median dividing point 19. It should be understood that this method of operation is likewise used on the opposing lower scatter bar 18.

In this specific combination of dimensions and mode of operation, this vertical placement has been found to provide acceptable division when the lower scatter bars are approximately three-fourths inch above the median dividing point 19 and approximately one-half inch below the joint 26.

The horizontal distance of the lower scatter bars 17 and 18 from the median dividing point 19 also coacts with the other dimensions to properly locate the dispersed flow of granules over the median dividing point 19. The specific combination of dimensions illustrated provides approximately seven-eighths inch between the lower scatter bars 17 and 18, with the median dividing point 19 being centered between them.

The scatter bars also operate to create a dispersal of the granules of material as they collide with one another.

It can be seen from the previously described construction details and methods of operation that the invention provides a simplified and more dependable gravity flow division principle which allows easy adaptation to a variety of material distribution systems, thereby, reducing equipment cost and eliminating operation problems that have previously limited the successful use of divider spouts.

In the specific example of the use of the invention with a seed planter; the divider spout is simply attached to the planter seed distribution box without special regard to the exact entry point of the seed, future slight movements of the spout, or change from one size seed to another. Furthermore, change from single row to double row seeding is possible by simply adding the divider spout and a seed furrow opening device as opposed to adding and arranging placement for a complete planter unit with the necessary seed distribution system. With these arrangements a farmer can take advantage of yield increases provided by double row planting of adapted crops, and still change back easily to single row seeding on those crops not well adapted to the practice.

Similar advantages are evident in the use of the invention with other agricultural equipment making various spaced applications of granules in the field.

The measurements and angles are given to aid in the construction and use of the invention. It is not intended that variation in these dimensions would constitute departure from the scope of this invention. Other successful combinations of dimensions and arrangements can be worked into a device using the principles and scope of this invention. For example, location of the lower scatter bars and chamber dimensions can be changed to affect the balance of division between the lower scatter bars 17 and 18 and the median dividing point 19.

The position of the lower scatter bars 17 and 18 can be changed to divert a greater part of the division into the opposing chamber and thus miss the median dividing point 19 with more of the diverted flow. Likewise, the position of the scatter bars 17 and 18 can be changed to divert a majority of the dispersed flow to the median dividing point 19 and thus handle more of the division between the two lower chambers with the median dividing point 19. Some of these changes will in fact be necessary to arrange the device for extremely large or extremely small granules.

The chambers could be changed from the illustrated round shape to square or other shapes and use the same principles and scope of this invention.

It is understood that it is intended to cover all changes and modifications of the examples of the invention herein chosen for the purpose of illustration, which do not constitute departure from the spirit and scope of the invention.

I claim as my invention:

1. A divider spout comprising an upper entry chamber, said upper entry chamber being of generally columnar construction so as to direct a downward flow of material with a minimum of constriction, two lower chambers dividing said upper entry chamber, two generally horizontal lower scatter bars each positioned above each said lower chamber transverse to the direction of division forming a passage between said scatter bar and the outside lower chamber wall, each of the said two lower scatter bars being further positioned substantially above the median dividing point of the inside lower chamber walls so as to deflect material down to and across said median dividing point, and through said passage wherein the said position of said lower scatter bars is further characterized as in horizontal opposition to each other and in vertical line with the column of space formed by the upper entry chamber, and whereby said position allows passage between said median dividing point and said lower scatter bars.

2. A divider spout according to claim 1 wherein a generally horizontal upper entry chamber scatter bar is positioned inside said upper entry chamber, being further disposed above and between the said lower scatter bars.

References Cited
UNITED STATES PATENTS

| | | | |
|---|---|---|---|
| 1,282,697 | 10/1918 | Johnson | 222—192 |
| 1,621,022 | 3/1927 | Merchan | 222—330 |
| 2,236,129 | 3/1941 | Baker | 222—478X |
| 1,338,161 | 4/1920 | Scott | 222—178 |
| 3,178,079 | 4/1965 | Johnson | 239—650 |

RICHARD E. AEGERTER, Primary Examiner

H. S. LANE, Assistant Examiner